United States Patent
Jano et al.

(10) Patent No.: US 11,622,388 B2
(45) Date of Patent: Apr. 4, 2023

(54) ENERGY EFFICIENT, RRC STATE AWARE UPLINK RADIO RESOURCE ALLOCATION

(71) Applicant: Nokia Technologies Oy, Espoo (FI)

(72) Inventors: Alba Jano, Munich (DE); Wolfgang Kellerer, Fuerstenfeldbruck (DE); Rapeepat Ratasuk, Inverness, IL (US); Nitin Mangalvedhe, Hoffman Estates, IL (US); Rakash Sivasiva Ganesan, Unterhaching (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 143 days.

(21) Appl. No.: 17/195,485

(22) Filed: Mar. 8, 2021

(65) Prior Publication Data

US 2022/0287099 A1    Sep. 8, 2022

(51) Int. Cl.
 *H04W 74/08* (2009.01)
 *H04W 76/28* (2018.01)
 *H04W 52/02* (2009.01)

(52) U.S. Cl.
 CPC ... *H04W 74/0833* (2013.01); *H04W 52/0209* (2013.01); *H04W 76/28* (2018.02)

(58) Field of Classification Search
 None
 See application file for complete search history.

(56) References Cited

U.S. PATENT DOCUMENTS 10,687,202 B2 * 6/2020 Byun .................. H04W 76/27
11,013,026 B2 * 5/2021 Zhang ................. H04W 72/569
(Continued)

FOREIGN PATENT DOCUMENTS

WO    2019/215553 A1    11/2019

OTHER PUBLICATIONS

"3rd Generation Partnership Project; Technical Specification Group Radio Access Network; NR; Medium Access Control (MAC) protocol specification (Release 16)", 3GPP TS 38.321, V16.2.1, Sep. 2020, pp. 1-154.

(Continued)

*Primary Examiner* — Faiyazkhan Ghafoerkhan
(74) *Attorney, Agent, or Firm* — Squire Patton Boggs (US) LLP

(57) ABSTRACT

Example embodiments of the invention provide at least apparatus for performing novel methods including receiving, by user device of a communication network, from a network node of the communication network at least one message including an access control indication, wherein the user device is in a radio resource control inactive state; and based on the user device meeting at least one requirement for use of the access control indication, performing operations comprising starting a random access procedure to enable at least one of an uplink or downlink data transmission between the user device and the communication network. In addition, at least apparatus for performing determining, by a network node of a communication network, at least one message comprising an access control indication for at least one user device, wherein the at least one user device is in a radio resource control inactive state; and communicating the at least one message with the at least one user equipment, wherein the at least one message is for causing operations comprising a random access procedure to enable communication with the communication network for use of the access control indication in response to the at least one user device meeting at least one requirement.

16 Claims, 11 Drawing Sheets

(56) References Cited

U.S. PATENT DOCUMENTS

| | | | | |
|---|---|---|---|---|
| 11,201,956 B2* | 12/2021 | Zhang | H04W 12/06 |
| 11,246,183 B2* | 2/2022 | Kim | H04W 76/28 |
| 11,399,408 B2* | 7/2022 | Babaei | H04W 76/27 |
| 2008/0037494 A1* | 2/2008 | Hietalahti | H04W 76/18 | 370/352 |
| 2013/0170479 A1* | 7/2013 | Fong | H04W 72/0446 | 370/336 |
| 2016/0234852 A1* | 8/2016 | Ko | H04L 5/0062 |
| 2017/0041776 A1* | 2/2017 | Faccin | H04L 65/1066 |
| 2017/0195882 A1* | 7/2017 | Liao | H04L 63/20 |
| 2018/0139778 A1* | 5/2018 | Chou | H04W 74/006 |
| 2018/0295499 A1* | 10/2018 | Faccin | H04L 65/1066 |
| 2019/0045577 A1* | 2/2019 | Kim | H04W 48/02 |
| 2019/0069160 A1* | 2/2019 | Byun | H04W 76/27 |
| 2019/0274089 A1* | 9/2019 | Castmo | H04W 48/02 |
| 2019/0289620 A1* | 9/2019 | Zhang | H04W 76/00 |
| 2019/0289661 A1* | 9/2019 | Chen | H04W 24/10 |
| 2019/0320316 A1* | 10/2019 | Mildh | H04W 80/08 |
| 2020/0037345 A1* | 1/2020 | Ryoo | H04W 72/1268 |
| 2020/0314667 A1* | 10/2020 | Fujishiro | H04W 24/02 |
| 2020/0323018 A1* | 10/2020 | Chen | H04W 36/08 |
| 2021/0259040 A1* | 8/2021 | Babaei | H04W 72/23 |
| 2022/0078697 A1* | 3/2022 | Tseng | H04W 76/30 |
| 2022/0078872 A1* | 3/2022 | Shrestha | H04W 76/30 |
| 2022/0132587 A1* | 4/2022 | Agiwal | H04W 76/27 |
| 2022/0159779 A1* | 5/2022 | Kim | H04W 48/02 |
| 2022/0225465 A1* | 7/2022 | Xu | H04W 76/27 |
| 2022/0232659 A1* | 7/2022 | Kim | H04W 76/28 |
| 2022/0287099 A1* | 9/2022 | Alba | H04W 74/0833 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"New SID on support of reduced capability NR devices", 3GPP TSG RAN Meeting #86, RP-193238, Agenda: 9.1.1, Ericsson, Dec. 9-12, 2019, 5 pages.

"3rd Generation Partnership Project; Technical Specification Group Services and System Aspects; Study on enhancements for cyber-physical control applications in vertical domains; Stage 1 (Release 17)", 3GPP TR 22.832, V17.3.0, Sep. 2020, pp. 1-87.

"3rd Generation Partnership Project; Technical Specification Group Services and System Aspects; Service requirements for cyber-physical control applications in vertical domains; Stage 1 (Release 17)", 3GPP TS 22.104, V17.4.0, Sep. 2020, pp. 1-76.

"3rd Generation Partnership Project; Technical Specification Group Services and System Aspects; Study on Communication for Automation in Vertical Domains (Release 16)", 3GPP TR 22.804, V16.3.0, Jul. 2020, pp. 1-197.

"Quantitative analysis on UL data transmission in inactive state", 3GPP TSG-RAN WG2 #97, R2-1701932, Agenda 10.2.2.2, ZTE, Feb. 13-17, 2017, pp. 1-15.

"3rd Generation Partnership Project; Technical Specification Group Services and System Aspects; Service requirements for the 5G system; Stage 1 (Release 18)", 3GPP TS 22.261, V18.0.0, Sep. 2020, 84 pages.

"3rd Generation Partnership Project; Technical Specification Group Radio Access Network; NR; Study on User Equipment (UE) power saving in NR (Release 16)", 3GPP TR 38.840, V16.0.0, Jun. 2019, pp. 1-74.

"Work Item on NR smalldata transmissions in Inactive state", 3GPP TSG RAN Meeting #86, RP-193252, Agenda: 9.1.2, ZTE Corporation, Dec. 9-12, 2019, 4 pages.

"3rd Generation Partnership Project; Technical Specification Group Radio Access Network; NG-RAN; Architecture description (Release 16)", 3GPP TS 38.401, V16.3.0, Sep. 2020, pp. 1-78.

"3rd Generation Partnership Project; Technical Specification Group Radio Access Network; NR; NR and NG-RAN Overall Description; Stage 2 (Release 16)", 3GPP TS 38.300, V16.3.0, Sep. 2020, pp. 1-148.

International Search Report and Written Opinion received for corresponding Patent Cooperation Treaty Application No. PCT/EP2022/053784, dated May 24, 2022, 13 pages.

"Release with redirection in 2 steps", 3GPP TSG-RAN WG2 Meeting #113 electronic, R2-2101657, Agenda: 6.16, Huawei, Jan. 25-Feb. 5, 2021, 6 pages.

"Remaining issues of RRC connection control from Inactive", 3GPP TSG-RAN WG2 #99bis, R2-1711664, Agenda: 10.4.1.3.6, Samsung, Oct. 9-13, 2017, pp. 1-7.

"TP for UE identification and access restriction", 3GPP TSG-RAN WG2 #113-e, R2-2100985, Agenda: 8.12.2.2, Ericsson, Jan. 25-Feb. 5, 2021, 19 pages.

* cited by examiner

ENERGY EFFICIENT, RRC STATE AWARE UPLINK RADIO RESOURCE ALLOCATION

TECHNICAL FIELD

The teachings in accordance with the exemplary embodiments of this invention relate generally to starting a random channel access procedure for transmitting data on an uplink and, more specifically, relate to transitioning by reduced capability UE from an RRC_Inactive state to an RRC_Connected state for transmitting uplink data when radio resources are not available.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK Acknowledgment
BSR Buffer Status Reporting
CN Core Network
DL Downlink
DRB Data Radio Bearer
EMBB Enhanced Mobile Broadband
DRX Discontinuous reception
gNB gNodeB
NACK Negative Acknowledgment
NR Next Generation
PUSCH Physical Shared Channel
RACH Random Access Channel
RAN Radio Access Network
RAR Random Access Response
RRC Radio Resource Control
RRM Radio Resource Management
SR Scheduling Request
SRB Signal Radio Bearer
TTI Transmission Time Interval
UE User Equipment
UL Uplink In current radio technology standards meetings, there have been introduced mechanisms for the user equipment (UE) to be suspended by the network in a state similar to RRC_IDLE for power savings while the UE has no data to transmit. Such submissions include operations for UE with data to transmit that include resuming an RRC connection instead of establishing an RRC connection from scratch.

Example embodiments of the invention work to improve at least these operations.

SUMMARY

This section contains examples of possible implementations and is not meant to be limiting.

In an example aspect of the invention, there is an apparatus, such as a user device side apparatus, comprising: at least one processor; and at least one memory including computer program code, where the at least one memory and the computer program code are configured, with the at least one processor, to cause the apparatus to at least: receive, by user device of a communication network, from a network node of the communication network at least one message comprising an access control indication, wherein the user device is in a radio resource control inactive state; and based on the user device meeting at least one requirement for use of the access control indication, perform operations comprising starting a random access procedure to enable an uplink data transmission with the communication network.

In another example aspect of the invention, there is a method comprising: receiving, by user device of a communication network, from a network node of the communication network at least one message comprising an access control indication, wherein the user device is in a radio resource control inactive state; and based on the user device meeting at least one requirement for use of the access control indication, performing operations comprising starting a random access procedure to enable at least one of an uplink or downlink data transmission between the user device and the communication network.

A non-transitory computer-readable medium storing program code, the program code executed by at least one processor to perform at least the method as described in the paragraphs above.

A further example embodiment is an apparatus and method comprising the apparatus and method of the previous paragraphs, wherein the at least one requirement comprises: at least one condition is met at the user device, wherein the random access procedure comprises: communicating with the network node information comprising a radio resource control resume request or radio resource control setup request; and determining, based on receiving a MSG4 from the communication network node, comprising one of a radio resource control resume or radio resource control setup or an indication that resources are not available and at least one value for at least one timer, wherein the information comprising the radio resource control resume request further comprises an indication that the user device is a reduced capability device and supports a capability for retransmitting the radio resource control resume request based on the at least one timer, wherein the at least one condition met at the user device comprises at least one of: a condition that the user device has uplink data to transmit, or a condition that the user device is not barred from performing the radio resource control resume procedure, or a class of the user device is of at least one class of reduced capability devices allowed to resume a connection with the communication network, wherein the access control indication is received based on a current state of radio resources and based on the uplink data to be transmitted before the user device, wherein the access control indication comprises a unified access control indication received via broadcast signaling from the network node, wherein based on determining that resources are not available, retransmitting the radio resource control resume request, wherein retransmitting the radio resource control resume request is based on the at least one timer comprising a waiting timer and a retry timer started at the user device, wherein the waiting timer is started in response to a radio resource control connection resume response from the network node indicating that an allocation of the resources is not available, wherein the waiting timer defines a maximum time the user device can wait to receive a radio resource control connection resume response from the network node indicating that an allocation of the resources is available and may take into account uplink timing advance validity considerations, wherein based on expiration of the waiting timer, the user device is configured with a discontinuous reception cycle causing the user device to go into a sleep mode for a duration of the discontinuous reception cycle before one of: receiving a radio resource control connection resume response from the network node or receiving resources from the network node for retransmitting the radio resource control resume request, wherein the retry timer defines a minimum time the user device must wait to receive resources from the network node for retransmitting the radio resource control resume request, and/or wherein based on an expiration of the at least one timer the user device waits for a period of time to start a random access procedure with the network node.

In another example aspect of the invention, there is an apparatus comprising: means for receiving, by user device of a communication network, from a network node of the communication network at least one message comprising an access control indication, wherein the user device is in a radio resource control inactive state; and means, based on the user device meeting at least one requirement for use of the access control indication, for performing operations comprising starting a random access procedure to enable at least one of an uplink data transmission between the user device and the communication network.

In accordance with the example embodiments as described in the paragraph above, at least the means for receiving and performing comprises a network interface, and computer program code stored on a computer-readable medium and executed by at least one processor.

In another example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a communication network, at least one message comprising an access control indication for at least one user device, wherein the at least one user device is in a radio resource control inactive state; communicate the at least one message with the at least one user equipment, wherein the at least one message is for causing operations comprising a random access procedure to enable communication with the communication network for use of the access control indication in response to the at least one user device meeting at least one requirement.

In another example aspect of the invention, there is a method comprising: determining, by a network node of a communication network, at least one message comprising an access control indication for at least one user device, wherein the at least one user device is in a radio resource control inactive state; and communicating the at least one message with the at least one user equipment, wherein the at least one message is for causing operations comprising a random access procedure to enable communication with the communication network for use of the access control indication in response to the at least one user device meeting at least one requirement.

A non-transitory computer-readable medium storing program code, the program code executed by at least one processor to perform at least the method as described in the paragraphs above.

A further example embodiment is an apparatus and method comprising the apparatus and method of the previous paragraphs, there is identifying whether resources can be allocated to the at least one user device over a predetermined more than one transmission time interval; and based on the identifying, transmitting in a MSG 4 toward the at least one user equipment comprising one of a radio resource control connection response or an indication that resources are not available and at least one value for at least one timer, wherein the at least one requirement comprises: at least one condition is met at the user device, wherein the random access procedure comprises communicating with the at least one user device information comprising a radio resource control resume request, wherein the information comprising the radio resource control resume request further comprises an indication that the user device is a reduced capability device and supports a capability for retransmitting the radio resource control resume request based on the at least one timer, wherein the at least one condition met at the at least one user device comprises: a condition that the at least one user device has uplink data to transmit, or a condition that the at least one user device is not barred from performing the radio resource control resume procedure, or a class of the user device is of at least one class of reduced capability devices allowed to resume a connection with the communication network, wherein the access control indication is communicated based on a current state of radio resources at the at least one user equipment and based on the uplink data to be transmitted before resources may be allocated to the at least one user device, wherein the access control indication comprises a unified access control indication communicated via broadcast signaling from the network node, wherein based on the resources are not available to be allocated, receiving from the at least one user equipment a retransmitted radio resource control resume request, wherein the retransmitted the radio resource control resume request is based on at least one timer comprising a waiting timer and a retry timer at the user device, wherein the waiting timer is started in response to a radio resource control connection resume response from the network node indicating that an allocation of the resources is not available, wherein the waiting timer defines a maximum time the user device can wait to receive a radio resource control connection resume response from the network node indicating that an allocation of the resources is available and may take into account uplink timing advance validity considerations, wherein the retry timer defines a minimum time the user device must wait to receive resources from the network node for retransmitting the radio resource control resume request and/or, wherein based on an expiration of the at least one timer the user device and waits for a period of time to start a random access procedure with the network node.

In another example aspect of the invention, there is an apparatus comprising: means for determining, by a network node of a communication network, at least one message comprising an access control indication for at least one user device, wherein the at least one user device is in a radio resource control inactive state; and means for communicating the at least one message with the at least one user equipment, wherein the at least one message is for causing operations comprising a random access procedure to enable communication with the communication network for use of the access control indication in response to the at least one user device meeting at least one requirement.

In accordance with the example embodiments as described in the paragraph above, at least the means for determining and communicating comprises a network interface, and computer program code stored on a computer-readable medium and executed by at least one processor.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
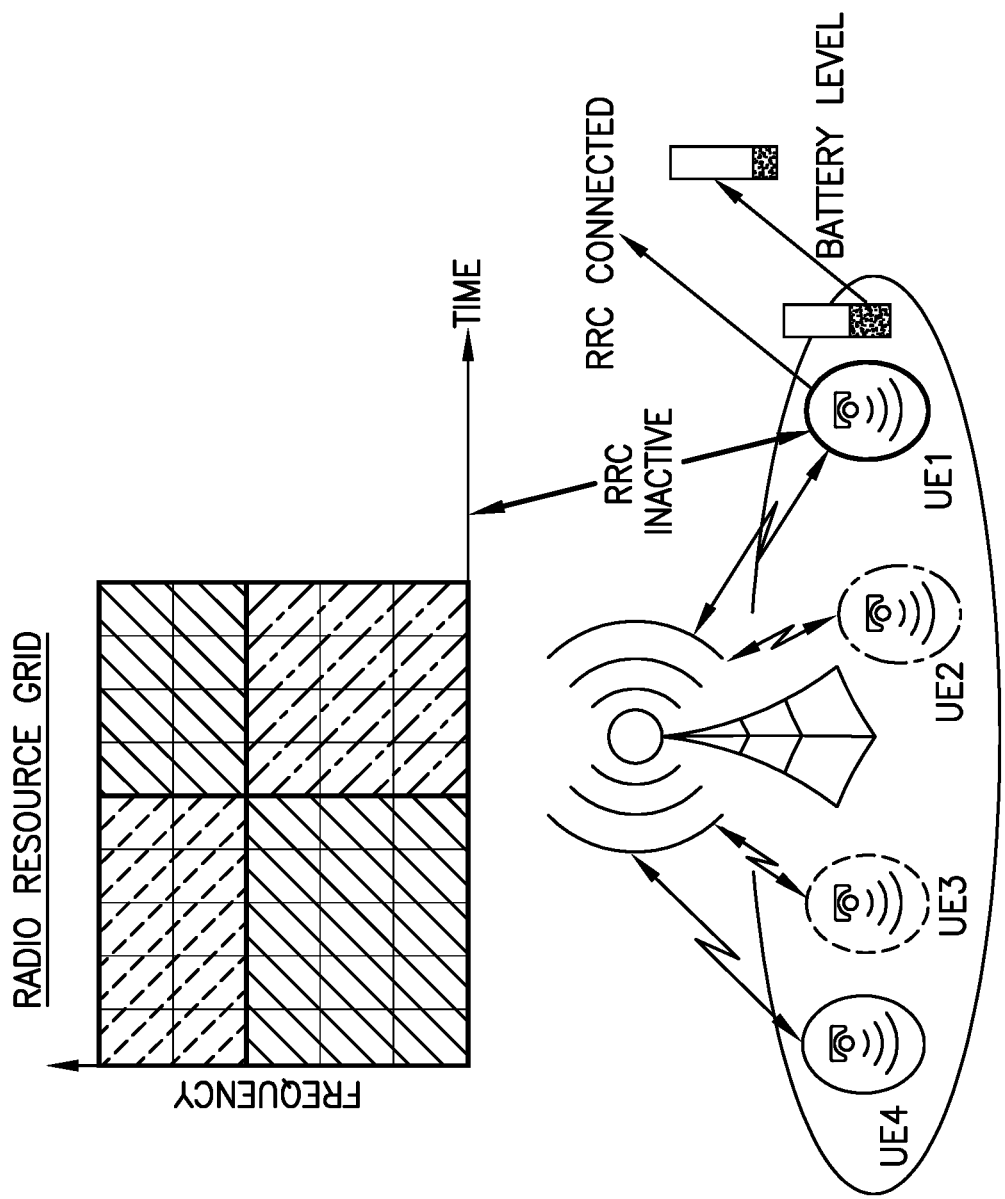
FIG. 1 shows an illustration of resource allocation mechanism problem when two devices are in RRC CONNECTED STATE and two other devices are in RRC INACTIVE STATE.

In this invention, there is proposed novel operations for reduced capability UE to transition from an RRC_Inactive or RRC_Idle state to an RRC_Connected state for transmitting uplink data or receiving downlink data when radio resources are not available.

Reduced Capability UEs

In 3GPP Rel-17, reduced capability UEs is introduced in RP-193238. The reduced capability UEs have lower device cost and complexity as compared to high-end eMBB and URLLC devices of Release 15/Release 16. Moreover, most use cases require that the standard enables a device design with compact form factor, and their system should support all FR1/FR2 bands for FDD and TDD. The intended use cases for reduced capability User Equipment (UEs) include:

The study item is seen to have the following objectives:

Industrial wireless sensors: Reference use cases and requirements are described in TR 22.832 and TS 22.104. Communication service availability is 99.99% and end-to-end latency less than 100 ms. The reference bit rate is less than 2 Mbps (potentially asymmetric e.g., UL heavy traffic) for all use cases and the device is stationary. The battery should last at least few years. For safety related sensors, latency requirement is lower, 5-10 ms., Video Surveillance: As described in TS 22.804, reference economic video bitrate would be 2-4 Mbps, latency <500 ms., reliability 99%-99.9%. High-end video e.g., for farming would require 7.5-25 Mbps. It is noted that traffic pattern is dominated by UL transmissions, and Wearables: Reference bitrate for smart wearable application can be 10-50 Mbps in DL and minimum 5 Mbps in UL and peak bit rate of the device is higher, 150 Mbps for downlink and 50 Mbps for uplink. Battery of the device should last multiple days (up to 1-2 weeks).

Study UE power saving and battery lifetime enhancement for reduced capability UEs in applicable use cases (e.g., delay tolerant) [RAN2, RAN1].

Random Access Procedure

Triggers of Random Access Channel (RACH) procedure, relevant to our invention, are as follows:
1. The transition from RRC INACTIVE or RRC IDLE TO RRC CONNECTED,
2. Uplink data arriving for a device in RRC CONNECTED when uplink synchronization status is non-synchronized,
3. Uplink data arrival during RRC CONNECTED state, when there are no Physical Uplink Control Channel (PUCCH) resources for Scheduling Request (SR) available. Besides the SR, to enable gNB to perform resource allocation, the device sends information related to the amount of data stored at the device buffer by using the Buffer Status Reporting (BSR). Referring to TS 38.321 the BSR procedure is used to provide the serving gNB with information about UL data volume in the MAC entity. Then network would allocate the bare minimum amount of UL Grant (Resources for PUSCH) if resources are available. With this mechanism, the network can optimize UL resources based on the following logic:
   Allocate UL resources (UL Grant) only when UE has something to transmit, and
   Avoid allocating too much UL resources (more than what UE needs) which lead to waste of resources.

The purpose of the device's transition from RRC INACTIVE to RRC CONNECTED state, is to resume a suspended RRC connection, including resuming Signal Radio Bearers (SRBs) and Data Radio Bearers (DRBs) or perform an RNA update. Similarly, the device can transition from RRC IDLE to RRC CONNECTED to initiate RRC connection setup. The device should ensure having valid and up to date essential system information as specifies in the clause 5.2.2.2 of TS 38.331 specification, before initiating the RRC Resume procedure, which consists in a contention-based 4 step RACH procedure, with estimated latency of 8.5 ms.

For MSG1: Random Access Preamble Transmission:

The RRC INACTIVE device transmits a preamble randomly selected from a set of preambles for contention-based random access. The time when UE transmits the preamble is determined by a list of allowed time slots allocated by the gNB.

For MSG2: Random Access Response (RAR):

The gNB, successfully receiving the preamble, transmits RAR including a temporary C-RNTI, timing advancement value for adjusting uplink synchronization and uplink resource allocation information for an RRC connection resume request message. gNB also includes the received preamble identifier in RAR for the device, so that the device can identify whether RAR is for itself or not.

For MSG3: RRC Connection Resume Request:

If the upper layers provide Access Category and Access Identities upon requesting the resumption of RRC connection, the device performs the unified access control procedure and sets the resume cause of MSG3 in accordance with the information received by the upper layers. If the access attempt is barred, the procedure ends.

Otherwise, the device initiates the transmission of RRC resume request message using uplink resources allocated through the RAR.

The configuration of RRC Resume Request message is shown below as from TS 38.331.

```
RRCResumeRequest ::=              SEQUENCE {
    rrcResumeRequest              RRCResumeRequest-IEs
}
RRCResumeRequest-IEs ::=          SEQUENCE {
    resumeIdentity                ShortI-RNTI-Value,
    resumeMAC-I                   BIT STRING (SIZE (16)),
    resumeCause                   ResumeCause,
    spare                         BIT STRING (SIZE (1))
}
```

In R2-1701932 it stated that in MSG3 of 4 step RACH based transmission, together with the RRC connection resume request, the RRC INACTIVE device can transmit a short BSR to report a buffer status.

For MSG4: RRC Connection Resume Response:

In response to request to resume the RRC connection, the network may:
  Resume the RRC connection by sending an RRC connection resume response message including Cell-RNTI (C-RNTI) to identify the device in the cell. As the device successfully receives the fourth message, the random access procedure is completed;
  Reject the RRC resume request and send the device in RRC INACTIVE state, with a Reject Wait Time;
  Directly re-suspend the RRC connection and send device to RRC INACTIVE;
  Directly release the RRC connection and send UE to RRC IDLE.
  Start a contention resolution timer;
  The ra-ContentionResolutonTimer value is defined in RACH-ConfigCommon of SIB1, during which the MAC entity will monitor the PDCCH after the MSG3 is transmitted. If the contention resolution timer expires, the device performs RACH procedure again if the number of RACH attempts has not reached the upper limit. The timer is applicable in the following scenarios:
  1. Initial RRC connection setup,
  2. RRC connection re-establishment,
  3. Uplink data arrival during RRC_CONNECTED when no synchronization,
  4. Uplink data arrival during RRC_CONNECTED when no PUCCH resources for SR available, and
  5. Scheduling request failure.

In most of the cases, for RRC resume, handover, request for specific system information procedures, the random access does not include a contention resolution timer. The device switches to contention-based RACH, when parameters, such as the quality threshold of dedicated resources, are not met.

Unified Access Control

Radio Access barring control refers to a traffic congestion control mechanism to secure and ensure the success of critical communications call such as emergency calls by restricting connection requests from devices to gNB. It is categorized into the following two methods:
  Access Control method (control in device).
  Before sending any connection request to gNB, device evaluates the broadcast information related to Unified Access Control (UAC) and determines whether a connection request for the call should be barred or not; and
  RRC connection reject method (control in gNB).
  gNB identifies the type of connection request sent from device and decides whether the request is served or rejected.

UAC in NR, applicable to UEs in RRC IDLE, RRC INACTIVE and RRC CONNECTED is defined in TS 22.261. Access control checks based upon one or more Access Identities and one Access Category. Depending on services or Access Classes, numbers from 0 to 15 define different Access Identities. Access Class is an identifier assigned by the network operator to each user to indicate the access priority. Access Identities from 3 to 10 are reserved for future use.

Similarly, Access Categories are defined by numbers from 0 to 63, where 32-63 are for future use, based on operator classification. The 5G system will provide single unified access control, where operators control access attempts based on these two aspects.

The uac-BarringInfo within SIB1 provides the necessary information to determine when an Access Barring check is required, and the configuration of uac-BarringFactor determines the threshold for barred or accepted attempts.

A new state "RRC INACTIVE" is specified in TS 38.331, in addition to the "RRC IDLE" and "RRC CONNECTED" states defined for 4G connectivity. The RRC INACTIVE state enables:
  1. Reduction of energy consumption and increase of battery efficiency while device stays in RRC INACTIVE state;
  2. Reduction of the delay caused when device needs to access the system and start the data transmission after inactivity periods; and
  3. Reduction of the signaling overhead in the Radio and the Core Network (CN)/RAN interfaces for devices coming from inactivity periods that want to transmit small amounts of data (e.g., MTC devices) or short data bursts (e.g., some types of smartphone traffic).

The energy efficiency becomes critical in NR for reduced capability devices, which have a stringent requirement for long battery life and limited accessibility. Multiple energy-saving schemes have been implemented in LTE and NR, consisting of Discontinuous Reception (DRX), reduction of Radio Resource Management (RRM) measurements, the transition from RRC CONNECTED to RRC IDLE/RRC INACTIVE states.

Besides transition from RRC CONNECTED to RRC IDLE/RRC INACTIVE state, the RRC Connection Resume procedure, consisting of the transition of the device from RRC INACTIVE to RRC CONNECTED state, has importance to save further energy at the device side. The RRC Resume procedure is initiated:
  by upper layers when the device needs to transition from RRC INACTIVE state to RRC CONNECTED state (the device has uplink data to transmit);
  or by RRC layer to perform an RNA update; and
  or by RAN paging from NG-RAN.

The RRC Resume procedure consumes energy for each signal transmitted to resume the connection as specified in TR 38.840. RRC Resume procedure has 12 RAN+CN signals, for which the relative energy consumption is 4800 µJ when device's transmission power is 0 dBm.

Until Release 16, the RRC INACTIVE state does not support data transmission. Consequently, the UEs with infrequent and small data transmission have to resume the connection for any UL data. Considering the energy consumption due to frequent RRC Resume procedure, in RP-193252 the concept of small data transmission is introduced. The small data transmission enables the transmission of data packets of small size. However, even the reduced capability devices may have continuous data to transmit, exceeding the defined amount of data per packet and the number of packets supported by the small data transmission feature. As a result, in order to send the data in the UL, the UE will perform the RRC Resume or RRC Connection Establishment procedure and switch to the RRC CONNECTED state.

Moreover, when a massive number of reduced capability devices connect to the wireless network, there might not be enough resources available to immediately serve this device. Hence, scenarios where devices have uplink data to transmit but the available radio resources are not sufficient to immediately serve all the UEs may appear in NR.

Consequently, transitioning of all devices that have pending data, from RRC INACTIVE or RRC IDLE to RRC CONNECTED, before executing the radio resource allocation mechanism, will cause unnecessary energy consumption, if devices cannot receive radio resources. The unnecessary energy consumption is caused by energy consumption for RRC Resume or RRC Connection Establishment procedure and the increased energy consumption while the device waits in RRC CONNECTED state without transmitting or receiving data and until the DataInactivityTimer expires as specified in TS 38.331. With the expiration of DataInactivityTimer, the device will transition back to the RRC INACTIVE state.

FIG. 1 shows an illustration of resource allocation mechanism problem when two devices are in RRC CONNECTED STATE and two other devices are in RRC INACTIVE STATE. Devices have different distance from the gNB and different data size to transmit in the uplink.

FIG. 1, shows an illustration of the UL radio resource allocation mechanism for devices in different states. In this scenario, we consider four UEs, identified as UE1, UE2, UE3 and UE4. UE2 and UE4 are already in RRC CONNECTED state and have uplink data to transmit. Meanwhile, UE1 and UE3 are in RRC INACTIVE state. Due to the uplink data in their buffer, UE1 and UE3 need to transition to RRC CONNECTED state. Consequently, the RRC Resume procedure takes place for devices that currently are in RRC INACTIVE state as specified in TS 38.401. In the current TTI, the resource allocation algorithm has assigned resources to just three devices (UE2, UE3, UE4). The figure depicts the lack of available radio resources for UE1, even though the device has transitioned to the RRC CONNECTED state. As a result of consuming higher power while in this state, the battery level of UE1 is decreased, even though uplink transmission cannot happen.

Two components are seen to be important for the prior art:
1. TS 38.401 specification and TS 38.300 specification, and
2. RP-193252 work item on NR small data transmission in RRC INACTIVE state and a patent application (Pub. No.: US 2018/0139778 A1 Data Packet Delivery in RRC INACTIVE state) which is similar to the work item.

Figure 2:
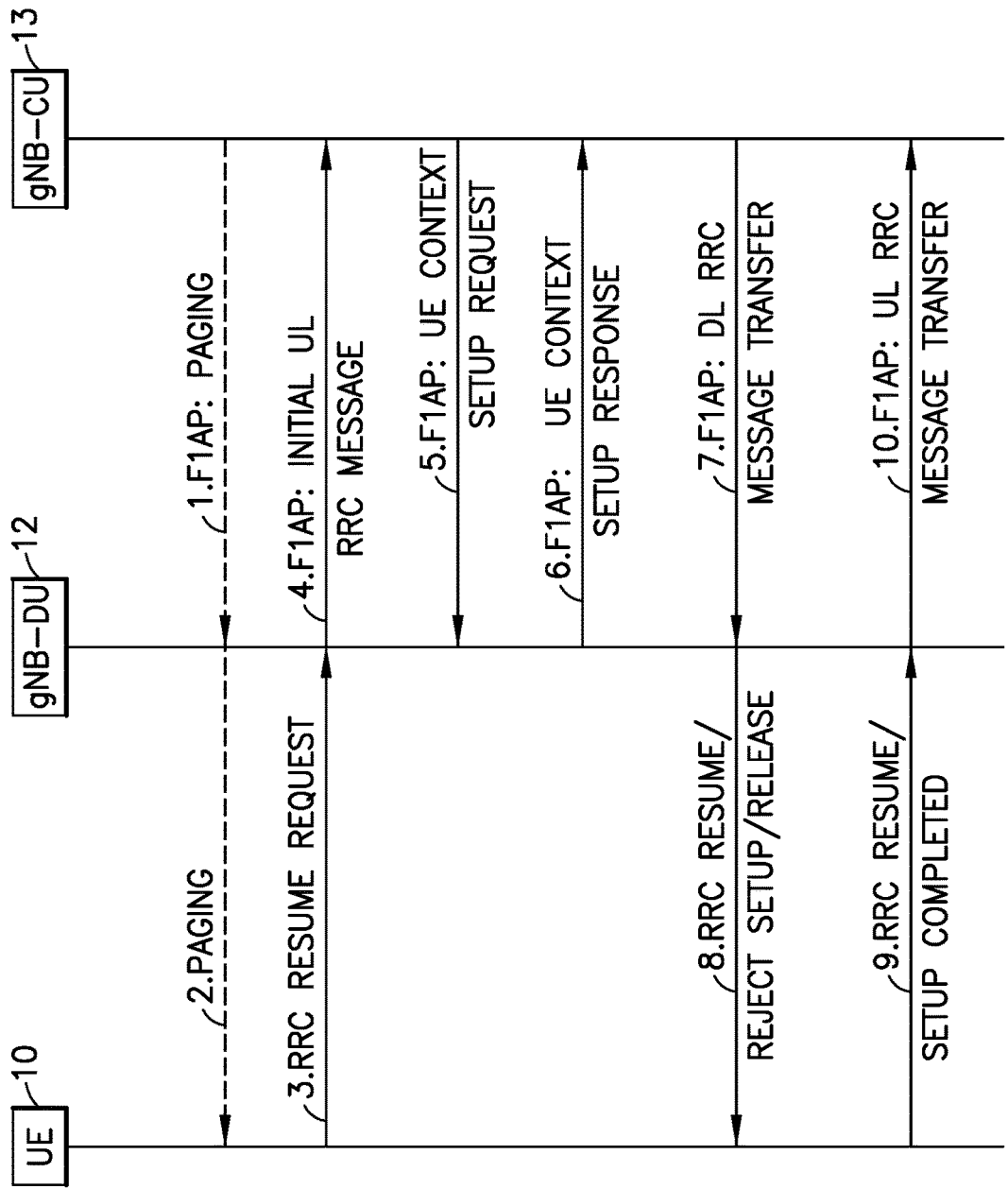
FIG. 2 illustrates a procedure followed when the device in RRC INACTIVE transitions to RRC CONNECTED state.

From TS 38.401 specification and TS 38.300 specification, FIG. 2 shows an RRC INACTIVE to other RRC states transition procedure.

In FIG. 2 there are shown steps:
1. If data is received from SGC, the gNB-CU sends PAGING message to gNB-DU;
2. The gNB-DU sends a Paging message to UE;
3. UE sends RRCResumeRequest message either upon RAN-based paging, UL data arrival or RNA update;
4. The gNB-DU includes RRCResumeRequest in a non-UE associated INITIAL UL RRC MESSAGE TRANSFER message and transfer to the gNB-CU;
5. For UE RRC INACTIVE to UE RRC CONNECTED transitions, excluding transitions due to signalling exchange only, the gNB-CU allocates gNB-CU UE F1AP ID and sends UE CONTEXT SETUP REQUEST message to gNB-DU, which may include SRB ID(s) and DRB ID(s) to be set up, CellGroupConfig stored in gNB-CU or retrieved from the old NG-RAN node may also be included. For retrieving the context from last serving gNB:
   The gNB, if able to resolve the gNB identity contained in the I-RNTI, requests the last serving gNB to provide UE Context data, and
   The last serving gNB provides UE context data; and
6. The gNB-DU responds with UE CONTEXT SETUP RESPONSE message, which contains RLC/MAC/PHY configuration of SRB and DRBs provided by the gNB-DU.

NOTE: In FIG. 2 step 5 and step 6 exist for RRC INACTIVE to RRC CONNECTED transitions, excluding transitions due to signalling exchange only. When gNB-CU successfully retrieves and verifies the UE context, it may decide to let the UE enter into RRC CONNECTED mode.

In addition, in FIG. 2 there are further steps:
7. The gNB-CU generates RRCResume/RRCSetup/RRCReject/RRCRelease message or receives RRCRelease message from the old NG-RAN node towards UE. The RRC message is encapsulated in DL RRC MESSAGE TRANSFER message together with SRB ID,
8. The gNB-DU forwards RRC message to UE either over SRB0 or SRB1 as indicated by the SRB ID,
9. UE sends RRCResumeComplete/RRCSetupComplete message to the gNB-DU, and
10. The gNB-DU encapsulates RRC in UL RRC MESSAGE TRANSFER message and send to the gNB-CU.

NOTE: IN FIG. 2 step 9 and step 10 exist for RRC INACTIVE to RRC CONNECTED state transition (for both cases of signaling exchange only, and UP data exchange). UE generates RRCResumeComplete/RRCSetupComplete message for resume the existing RRC connection or fallback to a new RRC connection respectively.

It is noted that the above specification cannot achieve energy efficiency because it aims to transition the devices in the connected state every time when data needs to be transmitted from the device side. As emphasized earlier, this method as proposed does not consider the limited number of radio resources and the scenario that the resources cannot support all the requests from the devices. In this case, for the scenario in FIG. 1, UE1 will transit to RRC CONNECTED state and wait for the resources to become available. This results in unnecessary loss of energy. In example embodiments of the invention there is solved a problem of energy saving, considering the lack of radio resources to support the data transmission of different services running at the device side.

Figure 3:
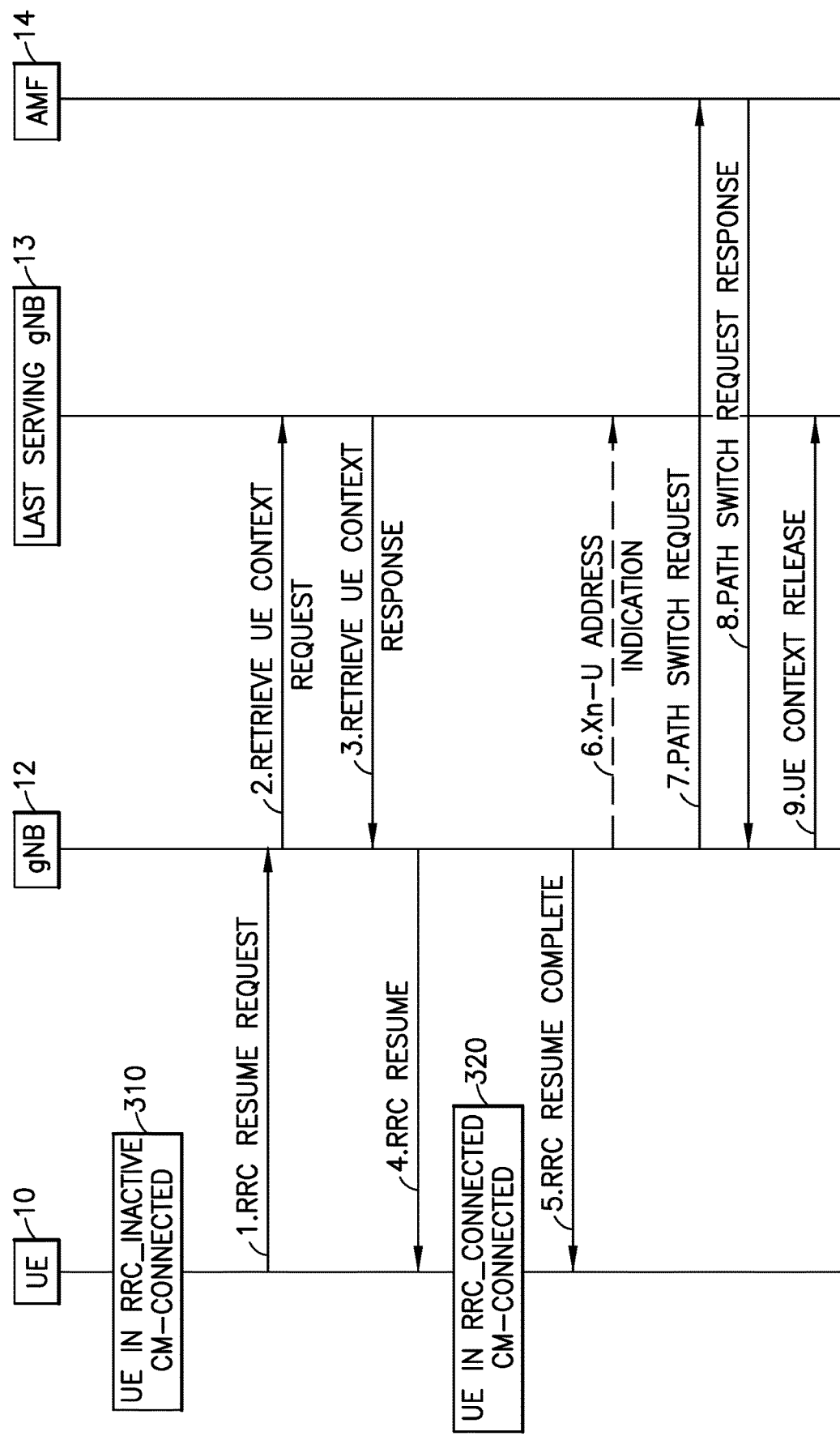
FIG. 3 illustrates another procedure followed when the device in RRC INACTIVE transitions to RRC CONNECTED state.

FIG. 3 illustrate the procedure followed when the device in RRC INACTIVE transitions to RRC CONNECTED state, when connected to the same gNB or changing the serving gNB, respectively.

As shown in FIG. 3 there is communication between the UE 10, gNB 12, a last serving gNB 13 and AMF 14. As shown in FIG. 3, following step 310 indicating the UE is in RRC_INACTIVE and CM-CONNECTED state, there is step 1 of FIG. 3 wherein the UE 10 communicates an RRC Resume Request with the gNB 12. The gNB 12 then communicates in step 2 of FIG. 3 a message with the last serving gNB 13 a request to retrieve the UE context. As shown in step 3 of FIG. 3 the gNB 12 retrieves the UE context Response from the last serving gNB 13. Then as shown in FIG. 3, following step 320 indicating the UE is in RRC_CONNECTED and CM-CONNECTED state, there is at step 5 of FIG. 3 the UE 10 receiving an RRC Resume Complete message from the gNB 12. In step 6 the gNB 12 communicates with the last serving gNB 13 an Xn-U Address Indication. In step 7 the gNB 12 communicates with the AMF 14 a Path Switch Request. In step 8 of FIG. 3 the gNB 12 receives from the AMF 14 a Path Switch Request Response from the AMF 14. Then in step 9 of FIG. 3 the gNB 12 communicates with the last serving gNB 13 a UE Context Release.

From RP-193252 Work Item:

NR supports RRC INACTIVE state and UEs with infrequent (periodic and/or non-periodic) data transmission is generally maintained by the network in the RRC INACTIVE state. Until Release 16, the RRC INACTIVE state doesn't support data transmission. Hence, the UE has to resume the connection (i.e., move to RRC CONNECTED state) for any downlink (DL) and UL data. Connection setup and subsequently release to INACTIVE state happens for each data transmission however small and infrequent the data packets are. This results in unnecessary power consumption and signalling overhead.

In general, any device that has intermittent small data packets in RRC INACTIVE state will benefit from enabling small data transmission in the INACTIVE state. The key enablers for small data transmission in NR, namely in the INACTIVE state, 2-steps, 4-step Random Access Channel (RACH) and configured grant type-1 have already been specified as part of Release 15 and Release 16.

Figure 4:
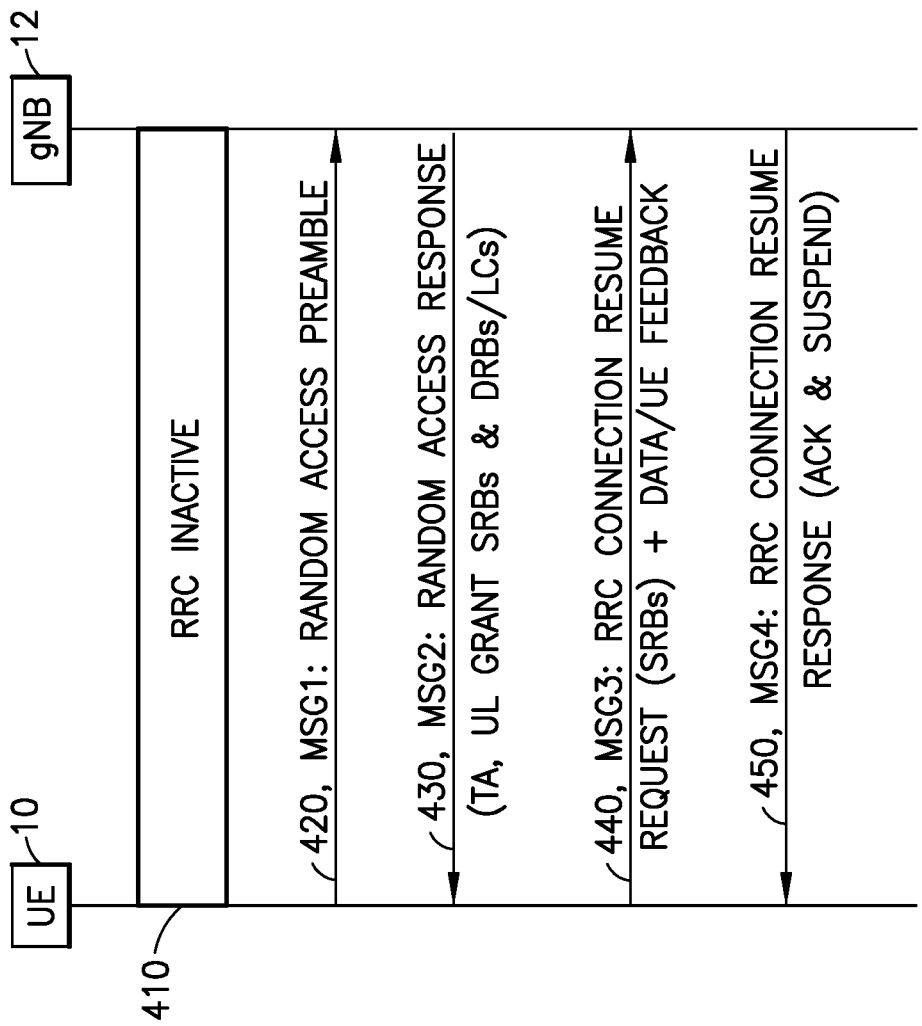
FIG. 4 shows a small data transmission mechanism.

FIG. 4 shows communications between a UE 10 and gNB 12 for a small data transmission mechanism. As shown in step 410 of FIG. 4 the UE is in an RRC Inactive state. As shown in step 420 of FIG. 4 there is communicated MSG 1 from the UE 10 to the gNB 12, which is the Random access preamble transmission. As shown in step 430 of FIG. 4, after receiving the Preamble, the gNB sends MSG2 to UE. MSG2 may include a Random Access Response, containing information related time advance and resource grant for at least one Signaling Radio Bearer (e.g., SRB0) and/or at least one Data Radio Bearer (DRB) to deliver an RRC Connection Resume Request and data packet(s) (e.g., small data Packet (s)), for example in MSG3. As shown in step 440 of FIG. 4 in a third signal between the UE 10 and the gNb 12, the RRC Inactive UE may send MSG3 to the gNB. MSG3 may include an RRC Connection Resume Request, having an RRC Resume ID provided by the gNB. Besides, UE may also transmit data packet(s) on indicated resource grant (e.g., radio resource granted by the gNB). Then as shown in step 450 of FIG. 4, after the gNB receives the data packet(s) from UE, it may send MSG4 or contention resolution message to UE, where MSG4 may include an RRC Response message (e.g., ACK/NACK message) to UE.

The Applicant notes that the work item and patent concentrate on small data transmission, therefore only small data packets can be transmitted using this concept. However, when larger and bursty data needs to be transmitted, the device has to resume the connection. In at least this regard, example embodiments of the invention handle the transmission of every type and size of data packets, considering the diversity of services which are supported by reduced capability devices.

It is noted that avoiding the transition from RRC INACTIVE to the RRC CONNECTED when radio resources are not available to support the demands of devices as disclosed herein is novel and clearly an inventive step.

It is noted that in the paragraphs below some main embodiments in accordance with example embodiments of the invention are underlined herein.

Example embodiments of the invention provide an energy-saving mechanism method for the devices in the cellular network at least as follows:

1. gNB indicates using the UAC information transmitted at SIB1, the classes of the devices that may attempt to resume their connection:

The Access Identities and Access Categories reserved for the future, as explained above, can be used to specify the reduced capability device capabilities or services, gNB transmits information in SIB1, based on the current state of radio resources and uplink data that still needs to be transmitted before the RRC INACTIVE devices may execute the RACH procedure to request uplink resources. If access is not permitted, the reduced capability devices will not attempt to resume the connection;

2. Allocating the radio resources while devices are in RRC INACTIVE and RRC CONNECTED states, before the completion of RRC Resume procedure for the RRC INACTIVE devices that have data to transmit in UL:

RRC INACTIVE device transmits the RA preamble as defined in paragraphs [0024] to [0040] above.

The RAR message is transmitted from gNB to the RRC INACTIVE devices, with specific parameters as defined in paragraphs [0024] to [0040] above.

RRC INACTIVE device's buffer status is known by the gNB after MSG3 of RACH procedure, as explained in paragraphs [0024] to [0040] above. To indicate support for the proposed mechanism, a device can report to the gNB that it is a reduced capability device using MSG3 of RACH procedure, gNB executes the RRC state aware radio resource allocation procedure after MSG3 while devices are still in RRC INACTIVE state. The radio resource allocation at any time may span multiple TTIs or slots, enabling the gNB to determine whether or not resources can be allocated to a device for a predetermined time period. The allocation of radio resources before transitioning to RRC CONNECTED state might take place for all the devices or only in the scenarios where reduced capability devices are present, 3. The gNB transmits to RRC INACTIVE devices that requested connection resumption using MSG4 of RACH procedure as follows:

RRC connection resume response, when RRC INACTIVE device receives resources,

For the other RRC INACTIVE devices, the gNB informs them about the lack of radio resources, a Waiting Timer value, and the procedure to be followed, as further explained below. The Waiting Timer defines the maximum time the device waits to receive a subsequent message from the gNB and may take into account uplink timing advance validity considerations (i.e., ensuring that the current timing advance may be considered valid for the duration of the timer). Therefore, the algorithm avoids the unnecessary transitions from RRC INACTIVE to RRC CONNECTED:

The RRC INACTIVE device waits for an RRC connection resume response message from the gNB until Waiting Timer expires. The device may be configured with DRX, in which case the device goes to sleep for the duration of the DRX cycle. The gNB generates the connection resume message when available resources are allocated to the device and when the device is known to be awake, Another approach is defined by gNB transmitting a novel timer value in MSG4 (Retry Timer). The Retry Timer determines the time an RRC INACTIVE device has to wait before trying again to receive radio resources from the network and transitioning to RRC CONNECTED state. When the Retry Timer expires, the device will resume the RRC Connection Resume procedure (e.g., retransmit the RRC Resume Request message in MSG3), and If the Waiting Timer expires the gNB directly resuspends the RRC connection and the device is still in RRC INACTIVE state.

Figure 9:
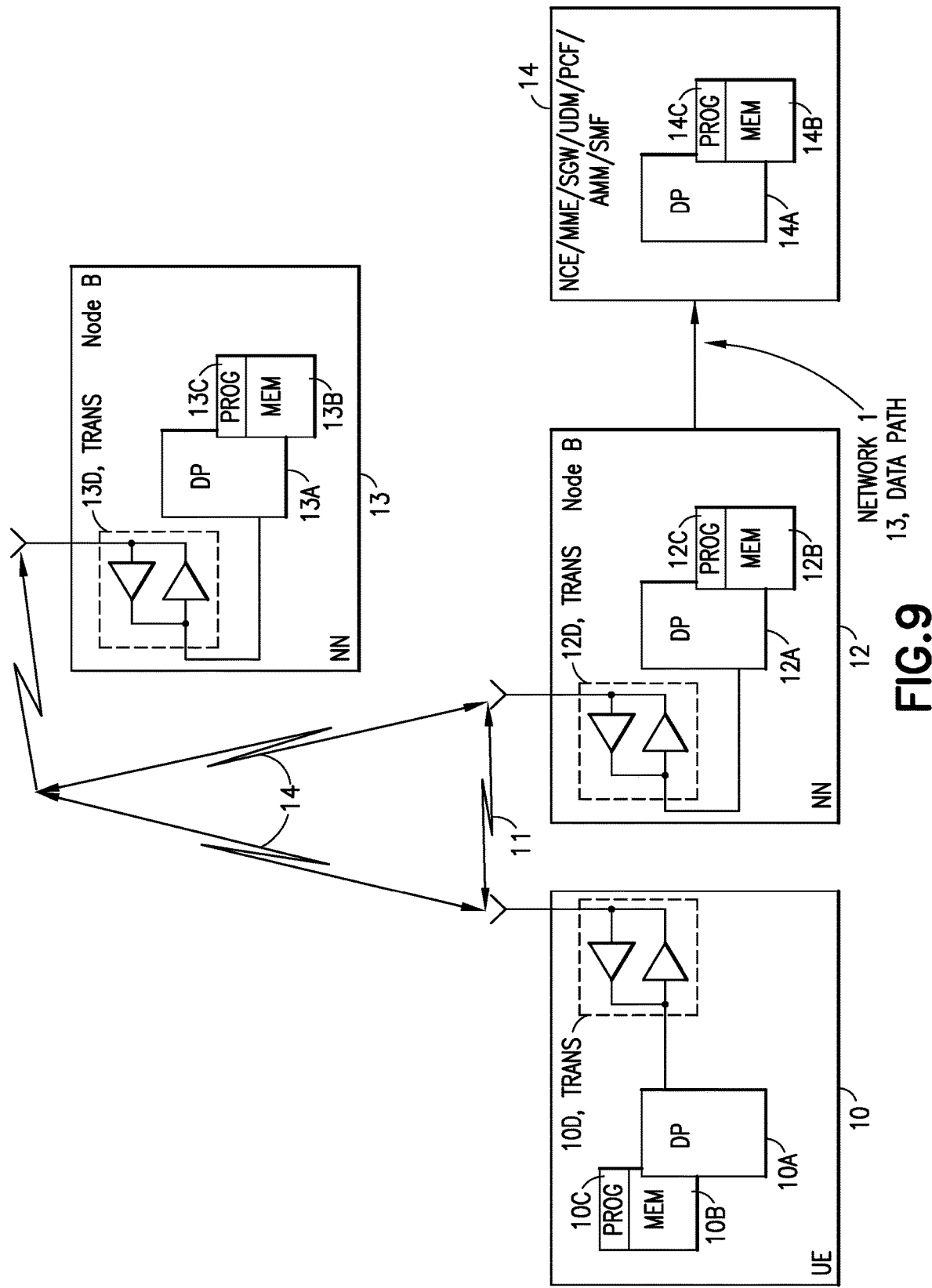
FIG. 9 shows a high level block diagram of various devices used in carrying out various aspects of the invention.

Before describing the example embodiments of the invention in detail, reference is made to FIG. 9 for illustrating a simplified block diagram of various electronic devices that are suitable for use in practicing the example embodiments of this invention.

FIG. 9 shows a block diagram of one possible and non-limiting exemplary system in which the example embodiments of the invention may be practiced. In FIG. 9, a user equipment (UE) 10 is in wireless communication with a wireless network 1. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to NN 12 and NN 13, respectively. The one or more memories MEM 10B include computer program code PROG 10C. The UE 10 communicates with NN 12 and/or NN 13 via a wireless link 11 and/or wireless link 14 as shown in FIG. 9.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 9. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/SGW//AMF/UPF device such as the NCE/MME/SGW/UDM/PCF/AMM/SMF 14 of FIG. 9. The NN 12 may perform functionalities of an MME (Mobility Management Entity) or SGW (Serving Gateway), such as a User Plane Functionality, and/or an Access Management functionality for LTE and similar functionality for 5G The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 via link 14 and communicate with the UE 10 via for example link 14 or another link. These links maybe wired or wireless or both and may implement, e.g., an X2 or Xn interface. Further, as stated above the link 11 may be through other network devices such as, but not limited to an NCE/MME/SGW device such as the NCE/MME/SGW/UDM/PCF/AMM/SMF 14 of FIG. 9. The connection between the NCE/MME/SGW/UDM/PCF/AMM/SMF 14 and the NN 12, NN 13, and/or UE 10 can be made via data path 13 which can be connected to link 11 and/or link 12.

The one or more buses of the device of FIG. 9 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to an RRH.

It is noted that although FIG. 9 shows a network nodes Such as NN 12 and NN 13. Any of these nodes may can incorporate or be incorporated into an eNodeB or eNB or gNB such as for LTE and NR, and would still be configurable to perform example embodiments of the invention.

Also, it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a NCE/MME/SGW/UDM/PCF/AMM/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 11 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

Figure 5:
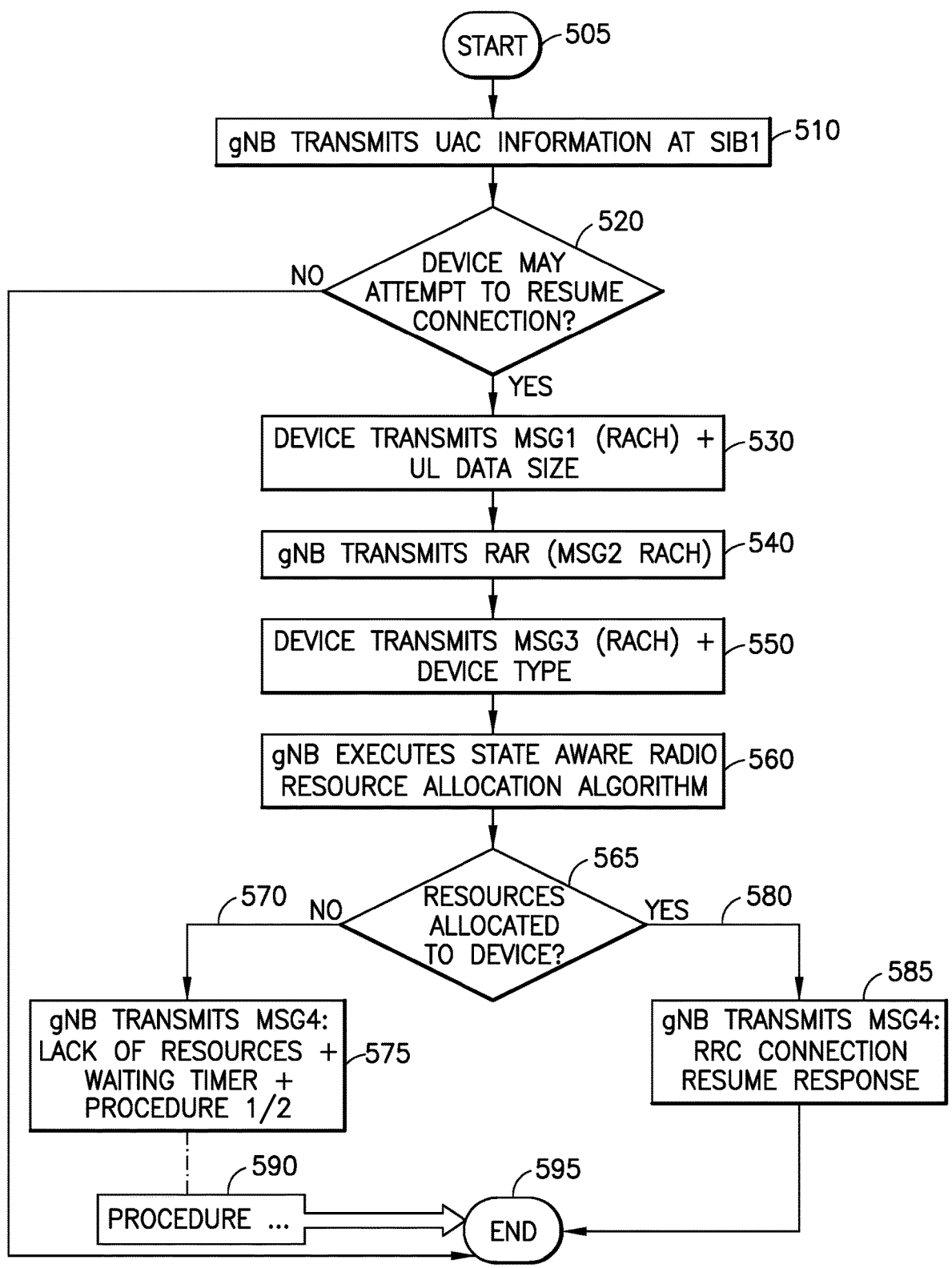
FIG. 5 shows a flowchart followed for each RRC s device for RRC state aware radio resource allocation mechanism.

FIG. 5 shows a flowchart followed for each RRC s device for RRC state aware radio resource allocation mechanism. After the Start as shown in step 505 of FIG. 5 there is:

In step 510 of FIG. 5 the gNB transmits UAC barring information in SIM. Device had UL data to transmit (not supported by small data transmission). As shown in step 520 of FIG. 5 there is a check if device may attempt to resume the connection:

I. If device class is barred—do not start the RACH procedure,

II. If device can attempt to resume connection—start RACH procedure;

In step 530 of FIG. 5 the Device transmits the preamble using MSG1;

In step 540 of FIG. 5 the gNB transmits RAR, using MSG2;

In step 550 the Device transmits RRC resume request, the short BSR and the device type, using MSG3;

In step 560 of FIG. 5 the gNB executes the RRC state aware radio resource allocation mechanism and determines resource allocation for devices;

In step 565 of FIG. 5 there is a check if radio resources are allocated to RRC INACTIVE or IDLE device:

I. As shown in steps 580 and 585 if resources allocated—gNB sends MSG4, RRC connection resume response or RRC setup message, II. As shown in steps 570 and 575 of FIG. 5 If resources not allocated—gNB sends information:

MSG4—"radio resources not available for allocation",

MSG4—"Waiting Timer value", and

MSG4—"Follow procedure 1/procedure 2"; and

As shown in steps 590 and 595 of FIG. 5 the Procedure ends.

Figure 6:
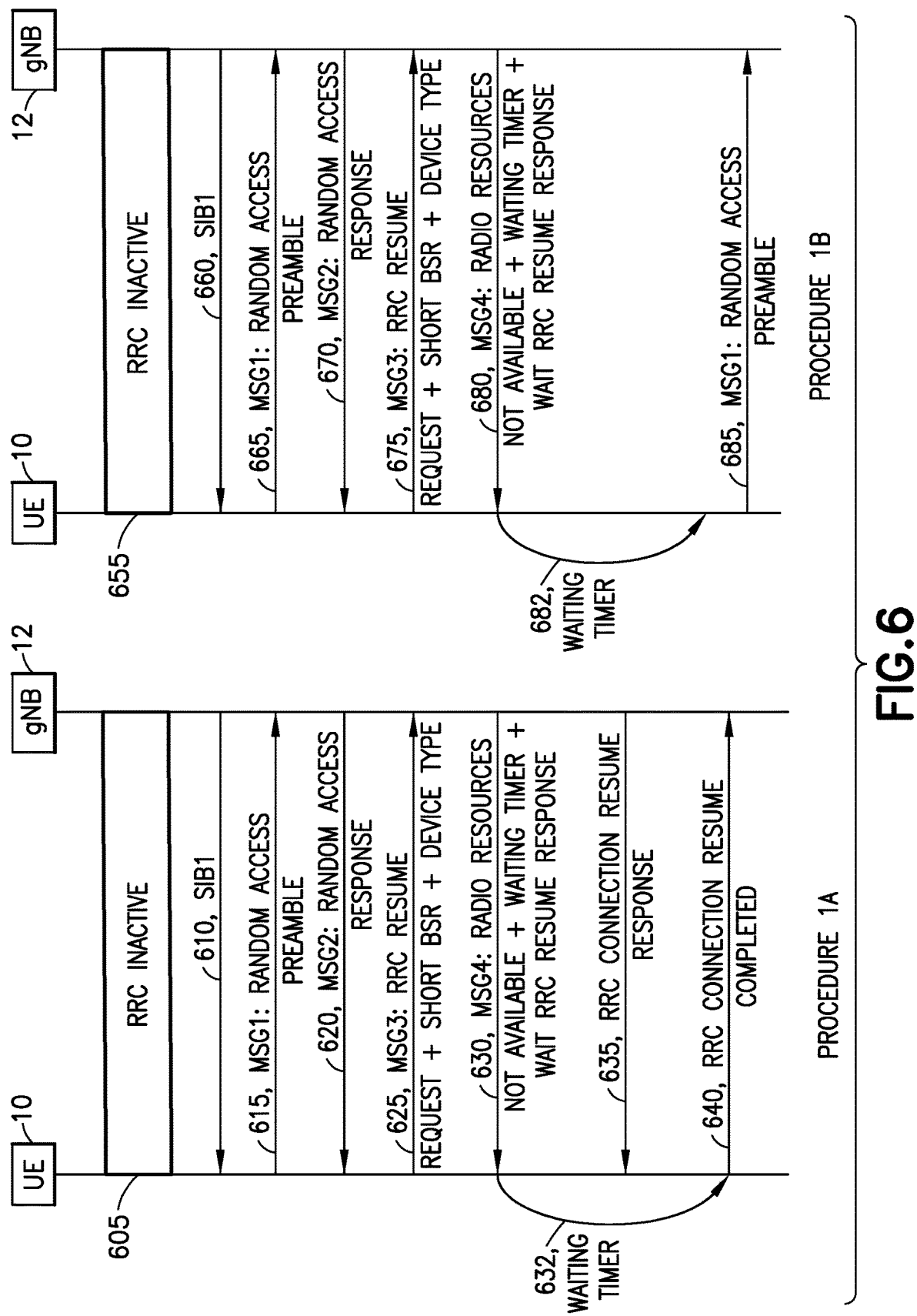
FIG. 6 illustrates the signaling diagram of a procedure 1 in accordance with example embodiments of the invention.

Procedure 1:

FIG. 6 illustrates the signaling diagram of a procedure 1 in accordance with example embodiments of the invention. FIG. 6 shows communications between a UE 10 and a gNB 12 in accordance with example embodiments of the invention.

Common steps for a Procedure 1A and Procedure 1B of a Procedure 1 in accordance with example embodiments of the invention as in FIG. 6 are described respectively below. In steps 605 and 655 there is at the UE 10 an RRC Inactive state. In steps 610 and 660 of FIG. 6 there is communicated between the gNB 12 and the UE 10 a system information block 1 (SIB1). In steps 615 and 665 of FIG. 6 there is communicated between the UE 10 and the gNB 12 a MSG1: Random Access Preamble. In steps 620 and 670 of FIG. 6 there is communicated between the gNB 12 and the UE 10 a MSG2: Random Access Response. Then in step 625 and 675 of FIG. 6 there is communicated between the UE 10 and the gNB 12 a MSG3: RRC Resume Request+Short BSR+device type. In steps 630 and 680 of FIG. 6 there is communicated between the gNb 12 and the UE 10 a MSG4: Radio resources not available+wait RRC resume response. At this time a timer 632 and 682 is started at the UE 10 in Procedure 1A and Procedure 1B of FIG. 6, respectively.

Following these steps, in Procedure 1A of FIG. 6 there is shown in step 635 of FIG. 6 an RRC connection resume response communicated between the gNB 12 and the UE 10. Then in step 640 of Procedure 1A of FIG. 6 there is communicated between the UE 10 and the gNB 1 an RRC connection resume completed message.

Similarly following the above step 680 in Procedure 1B of FIG. 6 there is shown in step 685 of FIG. 6 a MSG1: Random Access Preamble is again communicated between the gNB 12 and the UE 10 of FIG. 6

It is noted that as similarly stated above, upon reception of the MSG 4, the UE starts the Waiting Timer:
 I. If the gNB assigns radio resources to RRC INACTIVE device before the Waiting Timer expires, then the gNB indicates this by the RRC connection resume response. Then the device sends RRC connection resume completed and the RRC state of the device becomes RRC CONNECTED; and
 II. If Waiting Timer expires, then the device switches to RRC INACTIVE state, waits for an arbitrary amount of time and starts RACH procedure from MSG1

Figure 7:
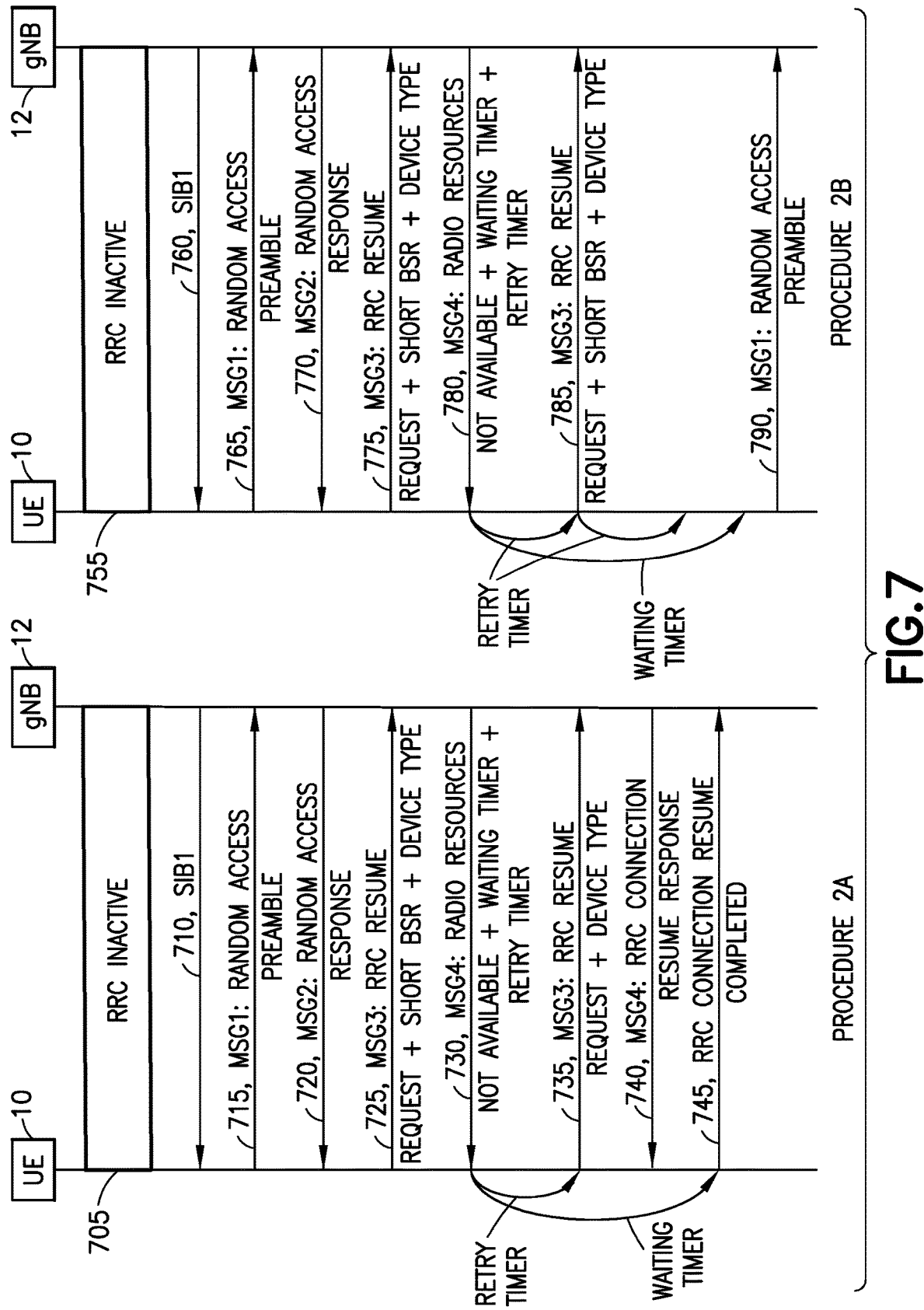
FIG. 7 illustrates the signaling diagram of a procedure 2 in accordance with example embodiments of the invention.

Procedure 2:

FIG. 7 illustrates the signalling diagram of one example embodiment of the invention procedure 2. As shown in FIG. 7 there is a Procedure 2A and a Procedure 2B for the procedure 2.

Common steps for a Procedure 2A and Procedure 2B of a Procedure 2 in accordance with example embodiments of the invention as in FIG. 7 are described respectively below. In steps 705 and 755 there is at the UE 10 an RRC Inactive state. In steps 710 and 760 of FIG. 7 there is communicated between the gNB 12 and the UE 10 a system information block 1 (SIB1). In steps 715 and 765 of FIG. 7 there is communicated between the UE 10 and the gNB 12 a MSG1: Random Access Preamble. In steps 720 and 770 of FIG. 7 there is communicated between the gNB 12 and the UE 10 a MSG2: Random Access Response. Then in step 725 and 775 of FIG. 7 there is communicated between the UE 10 and the gNB 12 a MSG3: RRC Resume Request+Short BSR+ device type. In steps 730 and 780 of FIG. 7 there is communicated between the gNb 12 and the UE 10 a MSG4: Radio resources not available+wait RRC resume response. At this time a waiting timer is started at the UE 10 in Procedure 2A and Procedure 2B of FIG. 7, respectively.

Following these steps, in Procedure 2A of FIG. 7 there is shown in step 735 of FIG. 7 a MSG3: RRC resume request and device type communicated between the UE 10 and gNB 12. Then in step 640 of Procedure 2A of FIG. 7 there is communicated between the gNB 1 and the UE 10 a MSG4: RRC Connection Resume Response. Then at step 745 of FIG. 7 there is communicated between the UE 10 and the gNB 12 an RRC connection resume completed message.

Similarly following the above step 780 in Procedure 2B of FIG. 7 there is shown in step 785 of FIG. 6 a MSG3: RRC Resume Request+short BSR+Device type communicated between the UE 10 and the gNB 12. Then as shown in step 790 of FIG. 7 there is again communicated between the UE 10 and the gNb 12 a MSG1: Random Access Preamble.

As similarly stated above, upon reception of the MSG4, the UE starts the Waiting Timer:
 I. If Waiting Timer has not expired and Retry Timer expires:
   UE monitors Type1-PDCCH for MSG4 or an uplink allocation for device to resend MSG3: RRC Resume Request
   If MSG4 contains RRC connection resume response, the device sends RRC connection resume completed and the RRC state of the device becomes RRC CONNECTED, and
   Otherwise, wait until Retry Timer or Waiting Timer expires; and
 II. If Waiting Timer expires, then the device switches to RRC INACTIVE state, waits for an arbitrary amount of time and starts RACH from MSG1.

Figure 8:
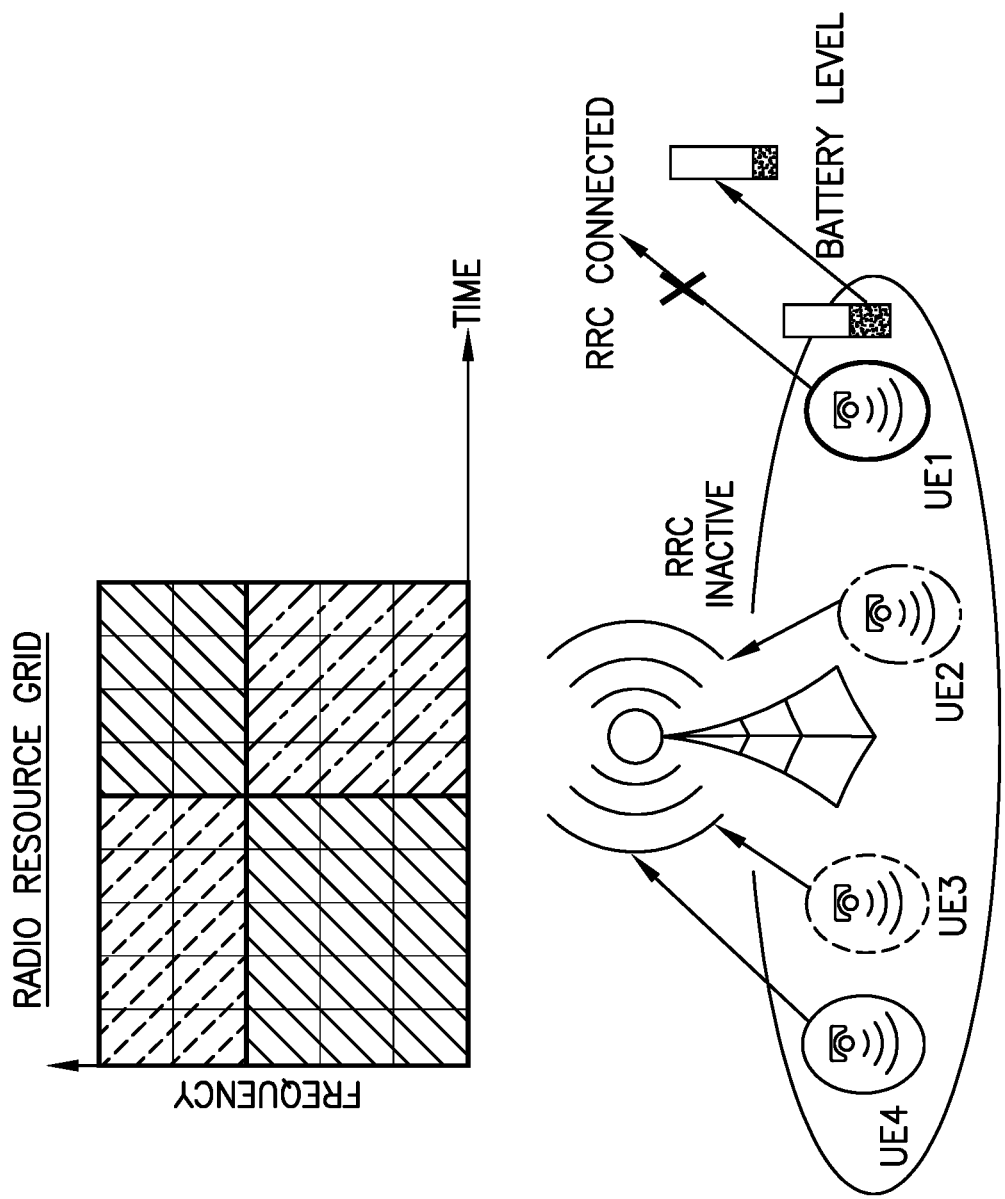
FIG. 8 illustrates a behavior of a proposed mechanism in accordance with example embodiments of the invention where gNB executes an RRC state aware radio resource allocation mechanism.

FIG. 8 illustrates the behavior of a proposed mechanism in accordance with example embodiments of the invention where gNB executes an RRC state aware radio resource allocation mechanism, meaning the allocation of the radio resources happens while the devices are in RRC CONNECTED and RRC INACTIVE state. In the scenario, there is considered four UEs, identified as UE1, UE2, UE3 and UE4. UE2 and UE4 are already at RRC CONNECTED state and have uplink data to transmit. Meanwhile, UE1 and UE3 are in RRC INACTIVE state. Due to the uplink data in their buffer, UE1 and UE3 need to transition to RRC CONNECTED state. The RRC state aware radio resource allocation mechanism creates the opportunity for omitting the transition to RRC CONNECTED state when radio resources are not available, as depicted for the UE1, which stays in RRC INACTIVE state, though it has data to transmit. UE1 may also go sleep if it is configured with DRX. The gNB may include this DRX configuration in MSG4 to UE1 when it indicates that radio resources are currently unavailable. As a result, the energy-saving at device side is increased. When resources are allocated to the device, as depicted for the UE3, the RRC Resume procedure is executed. Unified Access Control procedure assigns the priority among devices that require activation.

It is noted that example embodiments of the invention as disclosed herein can work based on a user device meeting at least one requirement for use of an access control indication, to enable performing operations comprising starting a random access procedure to enable at least one of an uplink or downlink data transmission between the user device and the communication network.

The novel operations as disclosed herein work to benefit enabling both uplink and downlink transmissions between user equipment and network devices without changing an inactive mode.

Figure 10A:
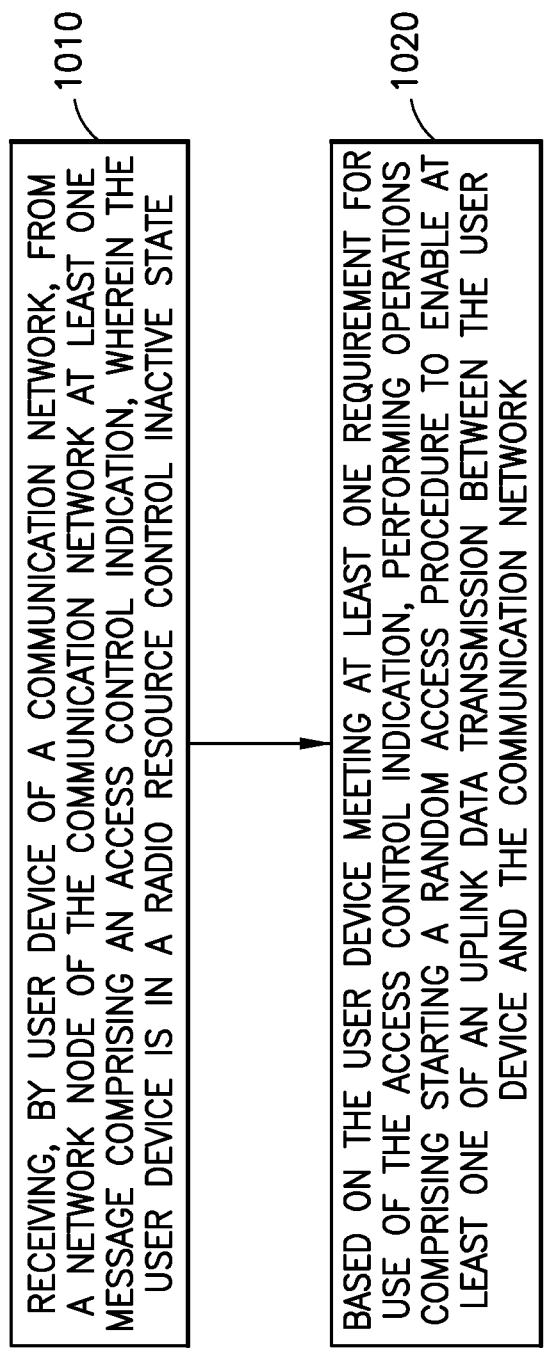
FIG. 10A and FIG. 10B each show a method in accordance with example embodiments of the invention which may be performed by an apparatus.

FIG. 10A illustrates operations which may be performed by a device such as, but not limited to, a device associated with a UE 10 as in FIG. 9. As shown in step 1010 of FIG. 10A there is receiving, by user device of a communication network, from a network node of the communication network at least one message comprising an access control indication, wherein the user device is in a radio resource control inactive state. Then as shown in step 1020 of FIG. 10A there is, based on the user device meeting at least one requirement for use of the access control indication, performing operations comprising starting a random access procedure to enable at least one of an uplink or downlink data transmission between the user device and the communication network.

In accordance with example embodiments of the invention as described in the paragraph above, wherein the at least one requirement comprises: at least one condition is met at the user device.

In accordance with example embodiments of the invention as described in the paragraphs above, wherein the random access procedure comprises: communicating with the network node information comprising a radio resource control resume request or a radio resource control setup request; and determining, based on receiving a message from the communication network node, one of a radio resource control resume or a radio resource control setup or an indication that resources are not available and at least one value for at least one timer.

In accordance with example embodiments of the invention as described in the paragraphs above, wherein the information comprising the radio resource control resume request further comprises an indication that the user device is a reduced capability device and supports a capability for retransmitting the radio resource control resume request based on the at least one timer.

In accordance with example embodiments of the invention as described in the paragraphs above, wherein the at least one condition met at the user device comprises at least one of: a condition that the user device has uplink data to transmit, or a condition that the user device is not barred from performing the radio resource control resume procedure, or a class of the user device is of at least one class of reduced capability devices allowed to resume a connection with the communication network.

In accordance with example embodiments of the invention as described in the paragraphs above, wherein the access control indication is received based on a current state of radio resources and based on the uplink data to be transmitted before the user device.

In accordance with example embodiments of the invention as described in the paragraphs above, wherein the access control indication comprises a unified access control indication received via broadcast signaling from the network node.

In accordance with example embodiments of the invention as described in the paragraphs above, wherein based on determining that resources are not available, retransmitting the radio resource control resume request.

In accordance with example embodiments of the invention as described in the paragraphs above, wherein retransmitting the radio resource control resume request is based on the at least one timer comprising a waiting timer and a retry timer started at the user device.

In accordance with example embodiments of the invention as described in the paragraphs above, wherein the waiting timer is started in response to a radio resource control connection resume response from the network node indicating that an allocation of the resources is not available.

In accordance with example embodiments of the invention as described in the paragraphs above, wherein the waiting timer defines a maximum time the user device can wait to receive a radio resource control connection resume response from the network node indicating that an allocation of the resources is available and may take into account uplink timing advance validity considerations.

In accordance with example embodiments of the invention as described in the paragraphs above, wherein based on expiration of the waiting timer, the user device is configured with a discontinuous reception cycle causing the user device to go into a sleep mode for a duration of the discontinuous reception cycle before one of: receiving a radio resource control connection resume response from the network node or receiving resources from the network node for retransmitting the radio resource control resume request.

In accordance with example embodiments of the invention as described in the paragraphs above, wherein the retry timer defines a minimum time the user device must wait to receive resources from the network node for retransmitting the radio resource control resume request.

In accordance with example embodiments of the invention as described in the paragraphs above, wherein based on an expiration of the at least one timer the user device waits for a period of time to start a random access procedure with the network node.

A non-transitory computer-readable medium (MEM 10B as in FIG. 9) storing program code (PROG 10C as in FIG. 9), the program code executed by at least one processor (DP 10A as in FIG. 9) to perform the operations as at least described in the paragraphs above.

In accordance with an example embodiment of the invention as described above there is an apparatus comprising: means for is receiving (TRANs 10D, MEM 10B, PROG 10C, and DP 10A as in FIG. 9), by user device (UE 10 as in FIG. 9) of a communication network (Network 1 as in FIG. 9), from a network node (NN 12 and/or NN 13 as in FIG. 9) of the communication network at least one message comprising an access control indication, wherein the user device is in a radio resource control inactive state; and means, based on the user device meeting at least one requirement, for performing use (TRANs 10D, MEM 10B, PROG 10C, and DP 10A as in FIG. 9) of the access control indication, performing (TRANs 10D, MEM 10B, PROG 10C, and DP 10A as in FIG. 9) operations comprising starting a random access procedure to enable at least one of an uplink or downlink data transmission between the user device and the communication network.

In the example aspect of the invention according to the paragraph above, wherein at least the means for receiving, performing, and starting comprises transceiver [TRANS 10D as in FIG. 9] a non-transitory computer readable medium [MEM 10B as in FIG. 9] encoded with a computer program [PROG 10C as in FIG. 9] executable by at least one processor [DP 10A as in FIG. 9].

Figure 10B:
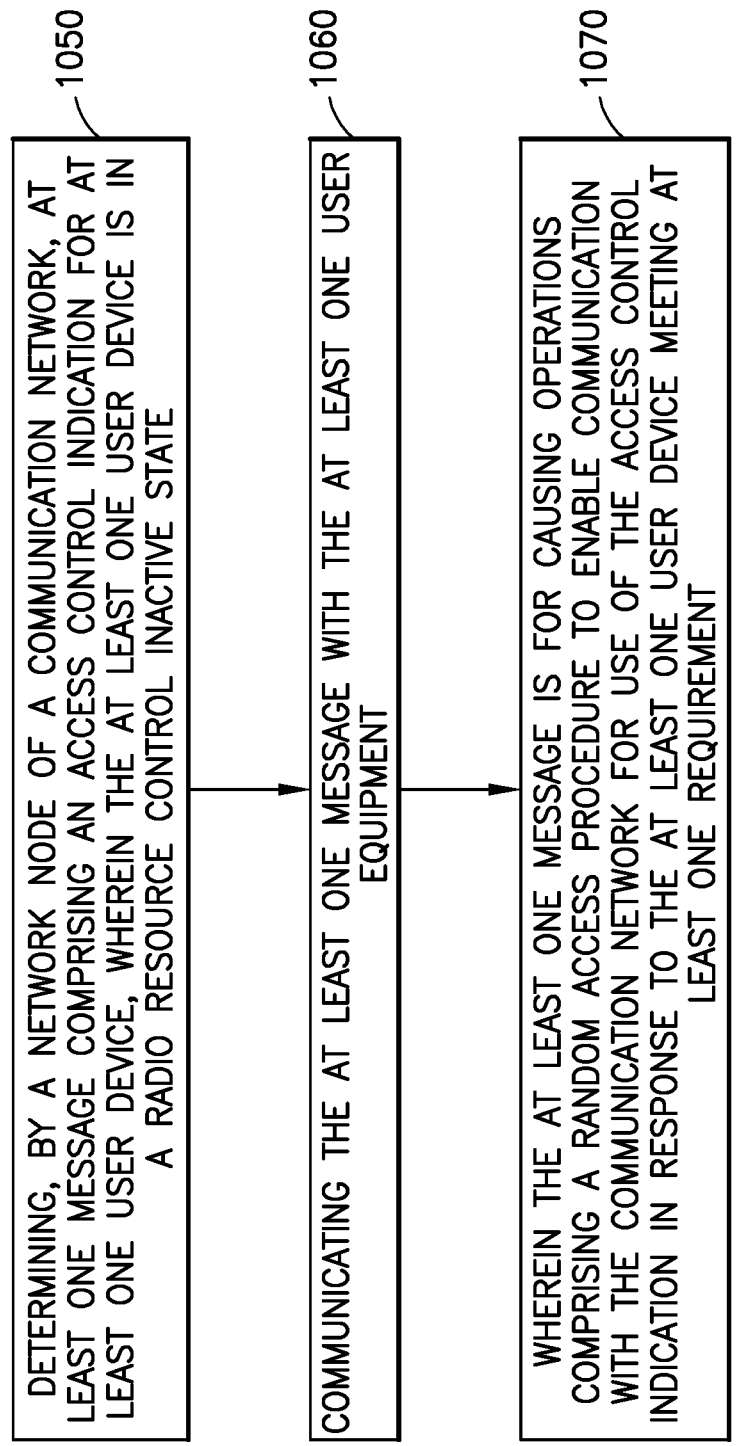

FIG. 10B illustrates operations which may be performed by a device such as, but not limited to, a device associated with an NN 12, and/or NN 13 as in FIG. 9. As shown in step 1050 of FIG. 10B there is determining, by a network node of a communication network, at least one message comprising an access control indication for at least one user device, wherein the at least one user device is in a radio resource control inactive state. As shown in step 1060 of FIG. 10B there is communicating the at least one message with the at least one user equipment. Then as shown in step 1070 of FIG. 10B it is identified wherein the at least one message is for causing operations comprising a random access procedure to enable communication with the communication network for use of the access control indication in response to the at least one user device meeting at least one requirement.

In accordance with example embodiments of the invention as described in the paragraph above, there is identifying whether resources can be allocated to the at least one user device over a predetermined more than one transmission time interval; and based on the identifying, transmitting in a MSG 4 toward the at least one user equipment comprising one of a radio resource control connection response or an indication that resources are not available and at least one value for at least one timer.

In accordance with example embodiments of the invention as described in the paragraphs above, wherein the at least one requirement comprises: at least one condition is met at the user device.

In accordance with example embodiments of the invention as described in the paragraphs above, wherein the random access procedure comprises communicating with the at least one user device information comprising a radio resource control resume request.

In accordance with example embodiments of the invention as described in the paragraphs above, wherein the information comprising the radio resource control resume request further comprises an indication that the user device is a reduced capability device and supports a capability for retransmitting the radio resource control resume request based on the at least one timer.

In accordance with example embodiments of the invention as described in the paragraphs above, wherein the at least one condition met at the at least one user device comprises: a condition that the at least one user device has uplink data to transmit, or a condition that the at least one user device is not barred from performing the radio resource control resume procedure, or a class of the user device is of at least one class of reduced capability devices allowed to resume a connection with the communication network.

In accordance with example embodiments of the invention as described in the paragraphs above, wherein the access control indication is communicated based on a current state of radio resources at the at least one user equipment and based on the uplink data to be transmitted before resources may be allocated to the at least one user device.

In accordance with example embodiments of the invention as described in the paragraphs above, wherein the access control indication comprises a unified access control indication communicated via broadcast signaling from the network node.

In accordance with example embodiments of the invention as described in the paragraphs above, wherein based on the resources are not available to be allocated, receiving from the at least one user equipment a retransmitted radio resource control resume request.

In accordance with example embodiments of the invention as described in the paragraphs above, wherein the retransmitted the radio resource control resume request is based on at least one timer comprising a waiting timer and a retry timer at the user device.

In accordance with example embodiments of the invention as described in the paragraphs above, wherein the waiting timer is started in response to a radio resource control connection resume response from the network node indicating that an allocation of the resources is not available.

In accordance with example embodiments of the invention as described in the paragraphs above, wherein the waiting timer defines a maximum time the user device can wait to receive a radio resource control connection resume response from the network node indicating that an allocation of the resources is available and may take into account uplink timing advance validity considerations.

In accordance with example embodiments of the invention as described in the paragraphs above, wherein the retry timer defines a minimum time the user device must wait to receive resources from the network node for retransmitting the radio resource control resume request.

In accordance with example embodiments of the invention as described in the paragraphs above, wherein based on an expiration of the at least one timer the user device and waits for a period of time to start a random access procedure with the network node.

A non-transitory computer-readable medium (MEM 12B or MEM 13B as in FIG. 9) storing program code (PROG 12C or PROG 13C as in FIG. 9), the program code executed by at least one processor (DP 12A or DP 13A as in FIG. 9) to perform the operations as at least described in the paragraphs above.

In accordance with an example embodiment of the invention as described above there is an apparatus comprising: means for determining (TRANS 12D or TRANS 13D, MEM 12B or MEM 13B, PROG 12C or PROG 13C, and DP 12A or DP 13A as in FIG. 9), by a network node 0 of a communication network (Network 1 as in FIG. 9), at least one message comprising an access control indication for at least one user device (UE 10 as in FIG. 9), wherein the at least one user device is in a radio resource control inactive state; means for communicating (TRANS 12D or TRANS 13D, MEM 12B or MEM 13B, PROG 12C or PROG 13C, and DP 12A or DP 13A as in FIG. 9) the at least one message with the at least one user equipment, wherein the at least one message is for causing (TRANS 12D or TRANS 13D, MEM 12B or MEM 13B, PROG 12C or PROG 13C, and DP 12A or DP 13A as in FIG. 9) operations comprising a random access procedure to enable communication with the communication network for use (TRANS 12D or TRANS 13D, MEM 12B or MEM 13B, PROG 12C or PROG 13C, and DP 12A or DP 13A as in FIG. 9) of the access control indication in response to the at least one user device meeting at least one requirement.

In the example aspect of the invention according to the paragraph above, wherein at least the means for determining, communicating, causing, and using comprises transceiver [TRANS 12D or TRANS 13D as in FIG. 9] a non-transitory computer readable medium [MEM 10B as in FIG. 9] encoded with a computer program [PROG 12C or PROG 13C as in FIG. 9] executable by at least one processor [DP 12A or DP 13A as in FIG. 9].

Example embodiments of the invention provide advantages at least including:
  The transition from RRC INACTIVE to RRC CONNECTED is omitted, when the UL data transmission cannot happen due to limited radio resources,
  Signalling overhead caused due to RRC Resume procedure is decreased, and
  Energy consumption at the device side is decreased, increasing the life of the device supported by the battery.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
(a) hardware-only circuit implementations (such as implementations in only analog and/or digital circuitry);
(b) combinations of hardware circuits and software, such as (as applicable):

(i) a combination of analog and/or digital hardware circuit(s) with software/firmware; and
(ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising: receiving, by a user device of a communication network, from a network node of the communication network at least one message comprising an access control indication, wherein the user device is in a radio resource control inactive state; and based on the user device meeting at least one requirement for use of the access control indication, performing operations comprising starting a random access procedure to enable at least one of an uplink or downlink data transmission between the user device and the communication network, the random access procedure comprises:
   communicating, with the network node, information comprising a radio resource control resume request or a radio resource control setup request; and determining, based on receiving a message from the network node, comprising one of a radio resource control resume or a radio resource control setup or an indication that resources are not available and at least one value for at least one timer, wherein based on determining that resources are not available, retransmitting the radio resource control resume request based on the at least one timer comprising a waiting timer and a retry timer started at the user device.

2. The method of claim 1, wherein the at least one requirement comprises: at least one condition is met at the user device, and wherein the at least one condition met at the user device comprises at least one of: a condition that the user device has uplink data to transmit, or a condition that the user device is not barred from performing a radio resource control resume procedure, or a class of the user device is at least one class of reduced capability devices allowed to resume a connection with the communication network.

3. The method of claim 1, wherein the waiting timer is started in response to a radio resource control connection resume response from the network node indicating that an allocation of the resources is not available.

4. The method of claim 1, wherein the waiting timer defines a maximum time the user device can wait to receive a radio resource control connection resume response from the network node indicating that an allocation of the resources is available and take into account uplink timing advance validity considerations.

5. The method of claim 1, wherein the retry timer defines a minimum time the user device must wait to receive resources from the network node for retransmitting the radio resource control resume request.

6. An apparatus comprising: at least one processor; and at least one memory including computer program code, wherein the at least one memory and the computer program code are configured, with the at least one processor, to cause the apparatus to at least: receive, by a user device of a communication network, from a network node of the communication network at least one message comprising an access control indication, wherein the user device is in a radio resource control inactive state; and based on the user device meeting at least one requirement for use of the access control indication, perform operations comprising starting a random access procedure to enable an uplink data transmission with the communication network, wherein the random access procedure comprises: communicating, with the network node, information comprising a radio resource control resume request or a radio resource control setup request; and determining, based on receiving a message from the network node, comprising one of a radio resource control resume or a radio resource control setup or an indication that resources are not available and at least one value for at least one timer, wherein based on determining that resources are not available, the apparatus is caused to retransmit the radio resource control resume request based on the at least one timer comprising a waiting timer and a retry timer started at the user device.

7. A method, comprising: determining, by a network node of a communication network, at least one message comprising an access control indication for at least one user device, wherein the at least one user device is in a radio resource control inactive state; and communicating the at least one message with the at least one user device, wherein the at least one message is configured to cause operations comprising a random access procedure to enable communication with the communication network for use of the access control indication in response to the at least one user device meeting at least one requirement; identifying whether resources can be allocated to the at least one user device over a predetermined more than one transmission time interval; and based on the identifying, transmitting in an MSG 4 toward the at least one user device comprising one of a radio resource control connection response or an indication that resources are not available and at least one value for at least one timer.

8. The method of claim 7, wherein the random access procedure comprises communicating with the at least one user device information comprising a radio resource control resume request.

9. The method according to claim 8, wherein the information comprising the radio resource control resume request further comprises an indication that the at least one user device is a reduced capability device and supports a capability for retransmitting the radio resource control resume request based on the at least one timer.

10. The method of claim 8, wherein based on the resources are not available to be allocated, receiving from the at least one user device a retransmitted radio resource control resume request.

11. The method of claim 10, wherein the retransmitted the radio resource control resume request is based on at least one timer comprising a waiting timer and a retry timer at the at least one user device.

12. The method of claim 11, wherein the waiting timer is started in response to a radio resource control connection resume response from the network node indicating that an allocation of the resources is not available.

13. The method of claim 11, wherein the waiting timer defines a maximum time the at least one user device can wait to receive a radio resource control connection resume response from the network node indicating that an allocation of the resources is available and take into account uplink timing advance validity considerations.

14. The method of claim 11, wherein the retry timer defines a minimum time the at least one user device must wait to receive resources from the network node for retransmitting the radio resource control resume request.

15. The method of claim 7, wherein the at least one requirement comprises: at least one condition is met at the at least one user device, and wherein the at least one condition met at the at least one user device comprises: a condition that the at least one user device has uplink data to transmit, or a condition that the at least one user device is not barred from performing a radio resource control resume procedure, or a class of the at least one user device is at least one class of reduced capability devices allowed to resume a connection with the communication network.

16. The method of claim 7, wherein the access control indication is communicated based on a current state of radio resources at the at least one user device and based on uplink data to be transmitted before resources may be allocated to the at least one user device.

* * * * *